(12) United States Patent
Labordus et al.

(10) Patent No.: US 11,597,162 B2
(45) Date of Patent: Mar. 7, 2023

(54) TOOLING FOR USE IN A METHOD FOR ELECTROMAGNETIC WELDING OF MOLDED PARTS, AND METHOD FOR MANUFACTURING THE TOOLING

(71) Applicant: KOK & VAN ENGELEN COMPOSITE STRUCTURES B.V., The Hague (NL)

(72) Inventors: Maarten Labordus, Delft (NL); Tom Jansen, The Hague (NL); Michiel Bruijkers, The Hague (NL)

(73) Assignee: KOK & VAN ENGELEN COMPOSITE STRUCTURES B.V., The Hague (NL)

( * ) Notice: Subject to any disclaimer, the term of this patent is extended or adjusted under 35 U.S.C. 154(b) by 122 days.

(21) Appl. No.: 17/311,843

(22) PCT Filed: Dec. 10, 2019

(86) PCT No.: PCT/NL2019/050820
§ 371 (c)(1),
(2) Date: Jun. 8, 2021

(87) PCT Pub. No.: WO2020/130806
PCT Pub. Date: Jun. 25, 2020

(65) Prior Publication Data
US 2022/0063210 A1    Mar. 3, 2022

(30) Foreign Application Priority Data
Dec. 20, 2018 (NL) .................................... 2022271

(51) Int. Cl.
*B29C 65/78* (2006.01)
*B29C 39/02* (2006.01)
(Continued)

(52) U.S. Cl.
CPC .......... *B29C 65/7841* (2013.01); *B29C 39/02* (2013.01); *B29C 65/32* (2013.01);
(Continued)

(58) Field of Classification Search
CPC ..... B29C 65/7841; B29C 65/32; B29C 39/02; B29C 66/82261; B29C 66/82421; B29K 2021/00; B33Y 80/00
See application file for complete search history.

(56) References Cited

U.S. PATENT DOCUMENTS

| | | | |
|---|---|---|---|
| 5,037,500 A | 8/1991 | Hilpert | |
| 6,082,683 A | 7/2000 | Yates | |
| 2014/0326411 A1* | 11/2014 | Konita | B29C 35/045 156/583.1 |

FOREIGN PATENT DOCUMENTS

WO    2008133507 A2    11/2008

OTHER PUBLICATIONS

International Search Report and Written Opinion for the International Patent Application No. PCT/NL20219/050820, dated Feb. 24, 2020, 10 pages.

* cited by examiner

*Primary Examiner* — Daniel McNally
(74) *Attorney, Agent, or Firm* — KDB Firm PLLC (57) ABSTRACT

A tooling for use in a method for electromagnetic welding of two contacted surfaces of molded parts. The tooling includes a rubber body and pressurizing means for pressurizing the rubber body and applying pressure to the contacted surfaces. The rubber body includes an embedded stiff body shaped such as to define different rubber body thicknesses in different directions, which causes a different pressure build-up in the different directions. A method for manufacturing the tooling. The tooling may be used in electromagnetic welding of two contacted surfaces of molded parts by moving a (Continued)

joining inductor along the contacted surfaces, generating an electromagnetic field in an induction-sensitive component of the molded parts to heat a thermally activated coupling means of the molded parts to above a melting temperature of the coupling means.

15 Claims, 7 Drawing Sheets

(51) Int. Cl.
*B29C 65/32* (2006.01)
*B29C 65/36* (2006.01)
*B29C 65/00* (2006.01)
B33Y 80/00 (2015.01)
B29K 21/00 (2006.01)
B29L 31/00 (2006.01)

(52) U.S. Cl.
CPC .... *B29C 65/3696* (2013.01); *B29C 66/82261* (2013.01); *B29C 66/82421* (2013.01); B29K 2021/00 (2013.01); B29L 2031/748 (2013.01); B33Y 80/00 (2014.12)

TOOLING FOR USE IN A METHOD FOR ELECTROMAGNETIC WELDING OF MOLDED PARTS, AND METHOD FOR MANUFACTURING THE TOOLING

This is a national stage application filed under 35 U.S.C. § 371 of international application PCT/NL2019/050820, filed Dec. 10, 2019, which claims priority to Netherlands Patent Application No. 2022271, filed Dec. 20, 2018, the entirety of which applications are hereby incorporated by reference herein.

TECHNICAL FIELD OF THE INVENTION

The invention relates to a method for joining molded parts by electromagnetic welding. The invention in particular relates to tooling for use in such a method for electromagnetic welding of two contacted surfaces of molded parts. The invention also relates to a method for electromagnetic welding that uses the tooling, and to a method for manufacturing the tooling.

BACKGROUND OF THE INVENTION

A number of technologies exist for joining molded parts, for instance fiber reinforced thermoplastic or thermosetting composite parts. Mechanical fastening and adhesive bonding are traditionally used to join two contact surfaces of the molded parts. However, both mechanical fastening and adhesive bonding appear to be costly and time consuming. Mechanical fastening for instance requires expensive hole locating, drilling, shimming, and fastener installation, while adhesive bonding requires complicated surface pre-treatments that may involve chemical substances.

Electromagnetic welding may eliminate the use of separate fasteners and potentially offers the ability to join contact surfaces of molded composite parts at relatively high speeds and little, if any, pre-treatments. Electromagnetic welding generates an electromagnetic field in an induction-sensitive component of one or more of the molded part(s) to heat a thermally activated coupling means of the molded part(s) to above a melting temperature of the coupling means. The contact surfaces of the molded parts are joined to each other by the molten coupling means. The coupling means may for instance be a thermoplastic resin of one or more of the parts to be joined, or may be a separately applied thermoplastic resin. For welding thermoplastic and thermoset molded parts together, the thermoplastic resin that the induction-sensitive component melts may function as a hot melt adhesive for instance.

A number of welding methods are available for creating a welded connection between molded parts such as fiber reinforced composite molded parts. In vibration welding the reinforcing fibers may be damaged by the movement, and ultrasonic welding is less suitable for continuous welding for instance. Known methods of electromagnetic welding may produce joined products of inferior quality, particularly in high-grade applications in which relatively high mechanical strength and load-bearing capacity of the welded connection is desired, such as in the aviation industry.

In order to be able to achieve an adequate quality weld with electromagnetic welding, it is generally required to apply sufficient pressure on the contacted surfaces of the molded parts that need to be connected by welding. The state of the art method of applying pressure to the contacted surfaces is generally based on the use of inflatable elements that transfer pressure on the components. Inflatable elements however provide an isotropic all-round pressure. The inflatable elements therefore must be enclosed in a mold cavity which is only open on the side where the pressure has to be exerted. This makes it necessary to apply robust, rigid and strong molds, which, however, is not always possible due to space restrictions. This for instance applies to products such as control surfaces, flaps, and other similar products. For induction welding, the use of strong metal molds is not preferred since metal molds heat up easily in an induction field.

Typical state of the art inflatable bodies comprise silicone hoses that radially expand when inflated. Applying uniform pressure on a flat laminate is not possible since more pressure is built up in the middle of the hoses than at their edges. Furthermore, in case of narrow products, there may not be enough room to provide a hose in a small radius section and build up sufficient pressure. Also, the all-round pressure build-up in state of the art methods may also provide such high forces in a tooling that said tooling is pushed away in a lateral direction.

SUMMARY OF THE INVENTION

It is an object of the present invention to provide an improved tooling for use in a method for joining molded parts by electromagnetic welding, in particular a tooling that overcomes at least part of the above mentioned problems of the state of the art.

The invention provides for this purpose a tooling for use in a method for joining molded parts by electromagnetic welding in accordance with claim 1. The tooling for use in a method for electromagnetic welding of two contacted surfaces of molded parts, comprises a rubber body and pressurizing means for applying pressure to the contacted surfaces by pressurizing the rubber body, wherein the rubber body comprises an embedded stiff body shaped such as to define different rubber body thicknesses in different directions, which causes a different pressure build-up in said different directions. This allows adapting the shape of the rigid body in such way that some parts of the rubber body exert a substantial pressure to contacted surfaces to be welded, while other parts of the rubber body that are not supposed to exert a substantial pressure, such as those parts that cover a mold surface for instance, apply a moderate pressure to that surface only, or substantially no pressure at all. The tooling of the invention in other words allows applying different pressures on different parts of an environment in which it is used, while being pressurized by one source only.

The stiffness of the stiff body according to the invention must be higher than the stiffness of the rubber body provided within and around the stiff body. The stiff body is typically manufactured from thermoplastic and/or thermosetting polymers having an elastic modulus of at least 3 MPa, more preferably of at least 3.5 MPa, and most preferably of at least 4 MPa. The stiff body may comprise reinforcing fibers, such as glass fibers, in order to influence its stiffness.

The rubber body may comprise one same type of rubber. However, in other embodiments, the rubber body may comprise different rubbers with different properties, preferably different hardness. Such a composite rubber body may be obtained for instance by pouring different rubbers on top of each other, or by other methods. The different hardness values may influence the pressure build up by the rubber body. In another useful embodiment, the rubber of the rubber body may comprise reinforcing fibers, such as glass fibers, in certain directions, which may likewise influence pressure build up in said directions.

In an embodiment of the invention, a tooling is provided wherein the pressure build-up is larger at smaller thickness. Parts of (the area of) the tooling that are supposed not to produce a substantial pressure in certain directions are provided with a larger thickness of the rubber body in said direction.

The rubber body and stiff body embedded therein may be free to move substantially independent from each other. In another preferred embodiment, the tooling is characterized in that the rubber body adheres to the embedded stiff body.

The tooling according to an embodiment of the invention is advantageous in that part of the rubber body that is aimed to pressurize the contacted surfaces has a smaller thickness than other parts of the rubber body. In this embodiment, the contacted surfaces are pressurized more than other parts of the molded products and/or other components used in the set-up such as mold parts.

A particularly preferred embodiment provides a tooling wherein that part of the rubber body that is aimed to pressurize the contacted surfaces has a smaller thickness than any other part of the rubber body. This embodiment provides the highest pressure where it is needed, i.e. at the surfaces that are brought in mutual contact in order to weld them together.

The shape of the tooling may be chosen according to the circumstances. It may be adapted, or even conform to the shape of one of the molded parts to be joined by electromagnetic welding. In an embodiment of the invention, a tooling is provided wherein the stiff body has an upper and lower surface and walls extending in between said surfaces, and a cavity extending between said surfaces and filled with a part of the rubber body. Such a tooling provides a relatively large pressure on surfaces that are in contact with the walls, and a relatively small pressure on surfaces that are in contact with the upper and lower surface of the filled cavity. This is because the thickness of the rubber body within the cavity is relatively large in the direction spanning the upper and lower surface, at least with respect to the thickness of the rubber body that covers the walls.

According to the invention, the tooling comprises pressurizing means for pressurizing the rubber body and applying pressure to the contacted surfaces. A useful embodiment provides a tooling wherein the pressurizing means comprises channeling provided in the stiff body, which channeling at one end is connected to a pressure source and at another end connects to the rubber body.

Although the pressurizing medium may be chosen at will, a liquid or a gas is preferred. In an embodiment, a tooling is provided wherein the pressure source comprises a source of pressurized air.

Electromagnetic welding heats up metallic parts that are within reach of the inductor and its induced electromagnetic field. This may not be preferred in some embodiments, and an embodiment of the tooling wherein the stiff body is made from a polymeric material is preferred. Any polymeric material may be used, with a preference for polymeric materials with a relatively good resistance against high temperatures in the range of 150-300° C. Examples of such materials are PEEK and PEKK, but thermosetting materials may also be used, such as epoxide, bismaleimid resins and the like.

The pressure exerted on the contacted surfaces and the intended welded connection during welding may inter alia influence the strength of the weld. In state of the art methods, the pressure is typically measured in the pressurizing pipe system outside the mold and tooling. This system of measuring pressure is relatively uninfluenced by a leak that occurs downstream of the pressurizing pipe system, for instance within the mold or close to the contacted surfaces. In such case, the effective pressure exerted on the contacted surfaces may actually be lower than measured.

A preferred embodiment in this context therefore provides a tooling in which the stiff body further comprises at least one pressure sensor. By incorporating a pressure sensor or gauge in the stiff body, the pressure can be measured directly in the pressurizing body, i.e. in the tooling itself. Also, pressure is measured at the same location each time molded parts are electromagnetically welded. This allows comparing different welding processes and assessing whether a particular process falls outside pressure tolerances.

Pressure sensors may be based on any physical principle such as optical, electrical and/or mechanical. A suitable embodiment provides a tooling wherein the pressure sensor comprises a strain gauge that measures the deformation ensuing from the pressure developed. The strain reading can be converted into an absolute pressure value, according to well-known practice.

Another important parameter may be the temperature within the welded area. Measuring in the weld may be complex, and state of the art methods therefore tend to measure the temperature on the outside of the welded connection. Incorporating thermocouples in the soldering may be one possibility. An embodiment of the present invention provides a tooling wherein the stiff body further comprises at least one temperature sensor. Such an embodiment may show the same advantages as the embodiment comprising a pressure sensor within the stiff body.

The optional pressure and/or temperature sensor(s) are preferably positioned and/or designed such that their reading is not substantially influenced by the electromagnetic field generated during welding.

Another aspect of the invention relates to a method for manufacturing a tooling in accordance with the invention. The method comprises forming the stiff body, providing a holder having the shape of the tooling, placing the stiff body inside the holder and pouring liquid rubber into the holder and let the rubber solidify to provide the rubber body. In the process of pouring the liquid rubber, optional cavities that are present in the stiff body are filled with liquid rubber. After solidification of the liquid rubber, the filled cavities are part of the rubber body of the tooling.

In an embodiment of the invention, a method is provided wherein the stiff body is formed by machining. According to this embodiment, a block of stiff body material may be shaped according to the needs, such as the shape of the molded parts to be welded. Machining may be carried out by any method known in the art, such as by milling, chipping, punching, tapping, threading, drilling, broaching, turning, and the like. Milling is a preferred method of machining.

In another embodiment of the method, the stiff body is formed by 3D printing. This allows building up the shape of the stiff body without taking away too much material. Other methods may also be suitable, such as pouring or casting.

It may be possible to incorporate objects into the stiff body during manufacture of the stiff body. For instance, parts of the stiff body may be machined away to make room for insertion of such an object. In 3D printing, an object may be positioned onto a partly 3D printed stiff body before continuing with 3D printing the remainder of the stiff body. In a useful embodiment the method is characterized in that at least one pressure sensor, or at least one temperature sensor is provided in the stiff body.

The tooling may be advantageously used in a method for electromagnetic welding of two contacted surfaces of molded parts. According to another aspect of the invention therefore, a method for electromagnetic welding of molded parts is provided, comprising pressurizing the rubber body of the tooling and applying pressure to the contacted surfaces, moving a joining inductor along the pressurized contacted surfaces of the molded parts, generating an electromagnetic field in an induction-sensitive component of the molded parts to heat a thermally activated coupling means of the molded parts to above a melting temperature of the coupling means, and joining the molded parts to each other in the contacted surfaces by the molten coupling means. The advantage of the invented tooling resides in its way to apply pressure. The pressure is not only substantially uniform across the contacted surfaces, but pressure build-up may be limited or even zero on other parts of the molded parts. Such pressure build-up would otherwise create a force that could potentially push the tooling away from the molded part to be welded. In many practical welding operations, the tooling can only be held on one side. Because space may be limited the tooling may be very slender and its stiffness limited. In such cases, the tooling could also tilt away due t pressure build-up on undesirable surfaces. The tooling according to the invention solves this and other problems.

The invented pressure tooling may be used in any kind of electromagnetic welding process. A suitable method of electromagnetic welding of molded parts comprises providing a mold, placing at least two molded parts for coupling in the mold, wherein the surfaces brought in contact with each other (the contacted surfaces) between the molded parts comprise a thermally activated coupling means and an induction-sensitive component, activating the coupling means by heating the induction-sensitive component by means of an inductor, wherein the inductor may be situated outside the mold, and pressing the molded parts together in the configuration defined by the mold whereby the tooling is used, wherein the molded parts are coupled by the thermally activated coupling means.

An inductor typically comprises an electrical conductor which, under alternating voltage, generates an electromagnetic field. The shape of the electromagnetic field may be any known shape, such as coiled, or substantially cylindrical in a direction of welding. The use of a substantially cylindrical electromagnetic field in the welding direction enables very controlled, uniform and targeted heating, so that overheating is prevented as far as possible. Overheating may result in degradation of material, and thereby cause undesirable weakening of the construction. Other inductors comprise a plurality of windings, which produces a torus-shaped electromagnetic field. By using such a known inductor with the direction at right angles to the inductor as direction of induction, a heating pattern is created in which a relatively cold zone occurs in the center. The cylindrical electromagnetic field on the other hand produces a much more favorable heating profile which enables uniform heating. A cylindrical electromagnetic field can moreover be made very narrow, up to a width of 10-20 mm. In torus-shaped fields such a width cannot be realized in combination with the required heat-inducing power and penetration.

The electromagnetic field of the inductor may reach the contacted surfaces between the molded parts directly, through sections of the molded part(s), and/or through a wall of the mold. The invented method and tooling make it possible to realize a good-quality welded connection or joint between the molded parts in a rapid and efficient manner, without having to use sturdy and heavy tooling. The obtained joined product has a particularly good mechanical load-bearing capacity.

One or more molded parts are preferably manufactured from a thermoplastic material which can be welded by fusion, although it is also possible to envisage arranging a thermoplastic material or a thermally activated adhesive only on the contact surface between the molded parts as thermally activated coupling means.

Induction-sensitive components generally comprise an electrically conductive component such as a metal and/or carbon fiber. The mold and other components in the vicinity of the inductor which do not have to be heated are preferably substantially free of induction-sensitive components or are shielded from the induction field with a suitable shielding material.

In the method the preferably thermoplastic molded parts are generally provided with an electrically conductive component, for instance metal gauze, or this component is arranged between the molded parts. Foucault currents or eddy currents are induced in the electrically conductive component by a fluctuating electromagnetic field which is generated by an inductor supplied with alternating current by a generator. Owing to several heating mechanisms like the Joule effect, fiber junction heating and dielectric hysteresis, these Foucault currents generate the heat required to melt the thermoplastic material and/or activate the coupling means. By moving the inductor along the contact surfaces the thermoplastic molded parts are mutually connected over their contact surface. The inductor can be guided over the contact surface for instance by means of a robot arm or linear guide, or any other moving means, in order to realize the connection.

For the purpose of heating, the induction-sensitive component must be in thermal contact with the thermally activated coupling means. This is for instance possible by mixing the induction-sensitive component and the coupling means.

An embodiment wherein the joining inductor is situated outside the mold and the electromagnetic field of the inductor reaches the contact surface between the molded parts through a wall of the mold, allows bringing the molded parts together under pressure by the mold during the welding. Other embodiments may apply pressure after the inductive heating of the molded parts for coupling has taken place.

Depending on the materials used, in particular the induction-sensitive component and the distance of the inductor from this component, a suitable power and frequency can be determined, as results from the sensing inductor response. The frequency determines inter alia the penetrative power of the electromagnetic field, the electric power of the inductor determines the strength of the fluctuating electromagnetic field and thereby the degree of heat generated in the induction-sensitive component.

It is advantageous if the thermally activated coupling means comprises a thermoplastic plastic. Thermoplastic plastics can be coupled in simple manner by fusion. Furthermore, it is easy to mix a thermoplastic plastic with an induction-sensitive component such as metal gauze or carbon fibers. Examples of particularly suitable thermoplastic plastics are polypropylene, polyamide, polyetherimide (PEI), polyetherketoneketone (PEKK), polyetheretherketone (PEEK) and polyphenylene sulfide (PPS), although the method is in principle suitable for any thermoplastic.

The component heatable by induction preferably comprises carbon fibers and/or a metal. These materials can be readily heated by induction and also have, in addition to electrical conduction, a good thermal conduction, whereby the generated heat is well distributed. Carbon fibers incorporated in a thermoplastic plastic are recommended because the carbon fibers also improve the material strength. In another preferred embodiment of the method the component heatable by induction comprises ferromagnetic or carbon nanoparticles.

It is possible for both the mold and the inductor to be stationary. This may for instance be appropriate for the coupling of a relatively small portion of the contact surfaces of the molded parts. In a preferred embodiment the inductor is moved along a path relative to the contact surfaces such that the coupling means is activated in a predetermined part of the contact surfaces. It is also possible to hold the inductor stationary and to move the mold with the molded parts.

For application in the method according to the invention the inductor is connected to an alternating current generator, wherein the alternating current generator is electrically connected to the electrical connecting means of the inductor. Usable frequencies lie generally between 0.1-10 MHz.

In a further preferred embodiment the induction part is provided with at least one feed channel adapted for passage of a cooling medium. The temperature of the induction part can hereby be held constant during use, this also being favorable for the electrical resistance of the inductor. The cooling medium is preferably a liquid such as water, with a high heat capacity. The induction part can for instance be a metal tube bent into the desired form, through which the cooling medium is pumped while an electromagnetic field is caused through the metal of the tube itself with an alternating voltage.

The embodiments of the invention described in this patent application can be combined in any possible combination of these embodiments, and each embodiment can individually form the subject-matter of a divisional patent application.

BRIEF DESCRIPTION OF THE FIGURES

The invention will now be elucidated with reference to the following figures, without however being limited thereto. In the figures.

DESCRIPTION OF EXEMPLARY EMBODIMENTS

Figure 1:
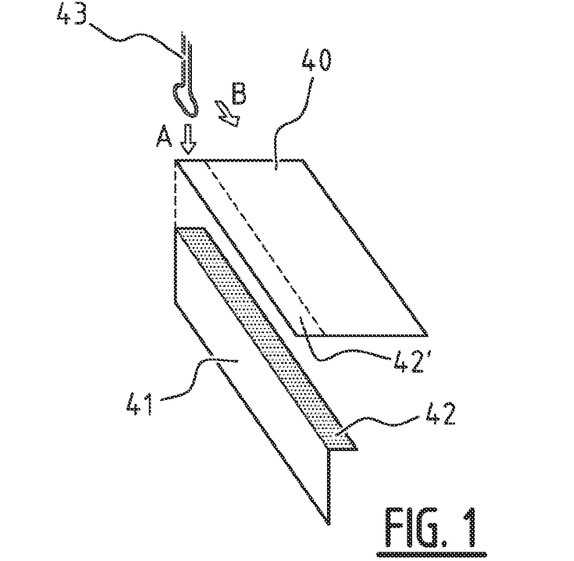
FIG. 1 schematically shows two molded parts to be coupled by a method according to the invention.

FIG. 1 shows two molded parts (40, 41) that need to be connected by electromagnetic welding. Both molded parts (40, 41) may be manufactured from a thermoplastic polymer reinforced with carbon fibres, wherein the carbon fibres also serve as induction-sensitive component for heating of the thermoplastic polymer for the purpose of welding. A first molded part 40 is a flat part, while a second molded part 41 has a folded edge 42 which forms the intended contact surface for coupling between the molded parts 40, 41. Obviously, other geometries of the molded parts may be used, and the invention is not limited to particular molded part geometries. The contact surfaces (42, 42') are brought into contact with each other and a linear inductor 43, providing a substantial cylindrical electromagnetic field heats the moulded parts (40, 41), and in particular the contacted surfaces (42, 42') to a temperature which is high enough to thermally activate the thermoplastic polymer, or, optionally, a thermally activated adhesive applied to the contact surfaces (42, 42'). The inductor may be moved over the contacted surfaces (42, 42) in the direction B without making physical contact with the parts (40, 41). During heating and/or optionally a short time thereafter, the thermally activated contacted surfaces (42, 42') must be pressed together in the direction A by appropriate tooling (not shown in FIG. 1) to obtain a well developed and strong connection between the molded parts (40, 41).

Figure 2:
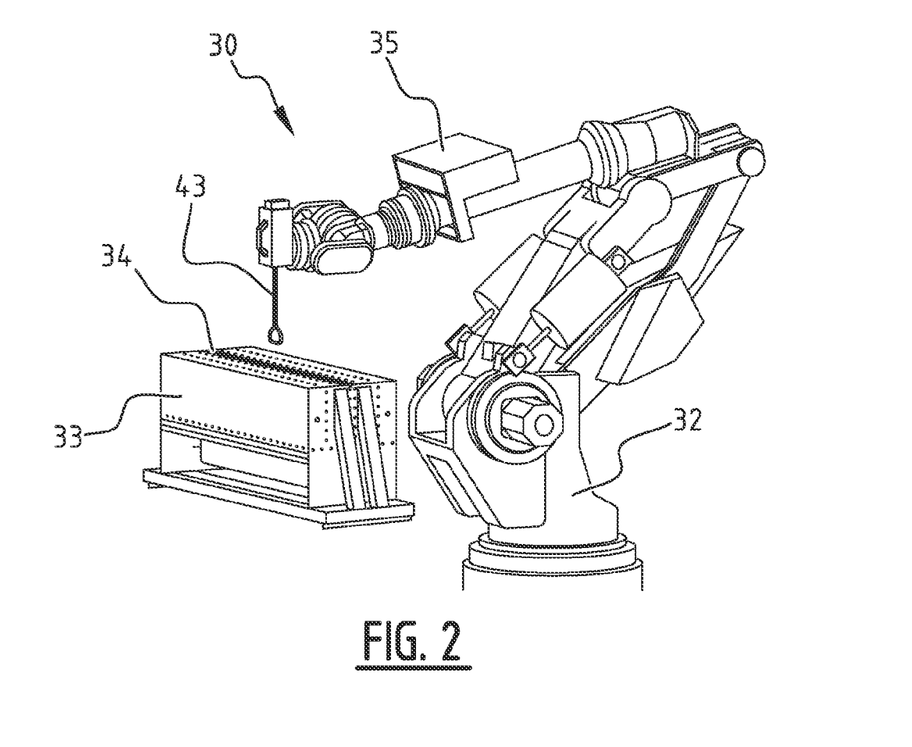
FIG. 2 schematically shows a welding device in accordance with one embodiment of the invention.

FIG. 2 shows an exemplary welding device 30 provided with a joining inductor 43. The inductor 43 may be guided along a line of welding which may be a pre-programmed path by means of an industrial six-axis robot 32 or other suitable moving means, in order to achieve a desired weld. In this case, molded parts for welding may be fixed and pressed together in a mold 33, manufactured for this purpose. Mold 33 may be provided with a recess 34 through which the inductor 43 may be moved close to the molded parts for welding. The inductor 43 may be connected to an alternating current generator 35 arranged on robot 32 for the purpose of generating the electromagnetic field. The mold 33 is on the inside provided with tooling that is in contact with the contacted surfaces (42, 42) to generate pressure onto the contacted surfaces (42, 42'). This pressure is generated by inflating the tooling against the mold 33 inner surfaces.

Figure 3:
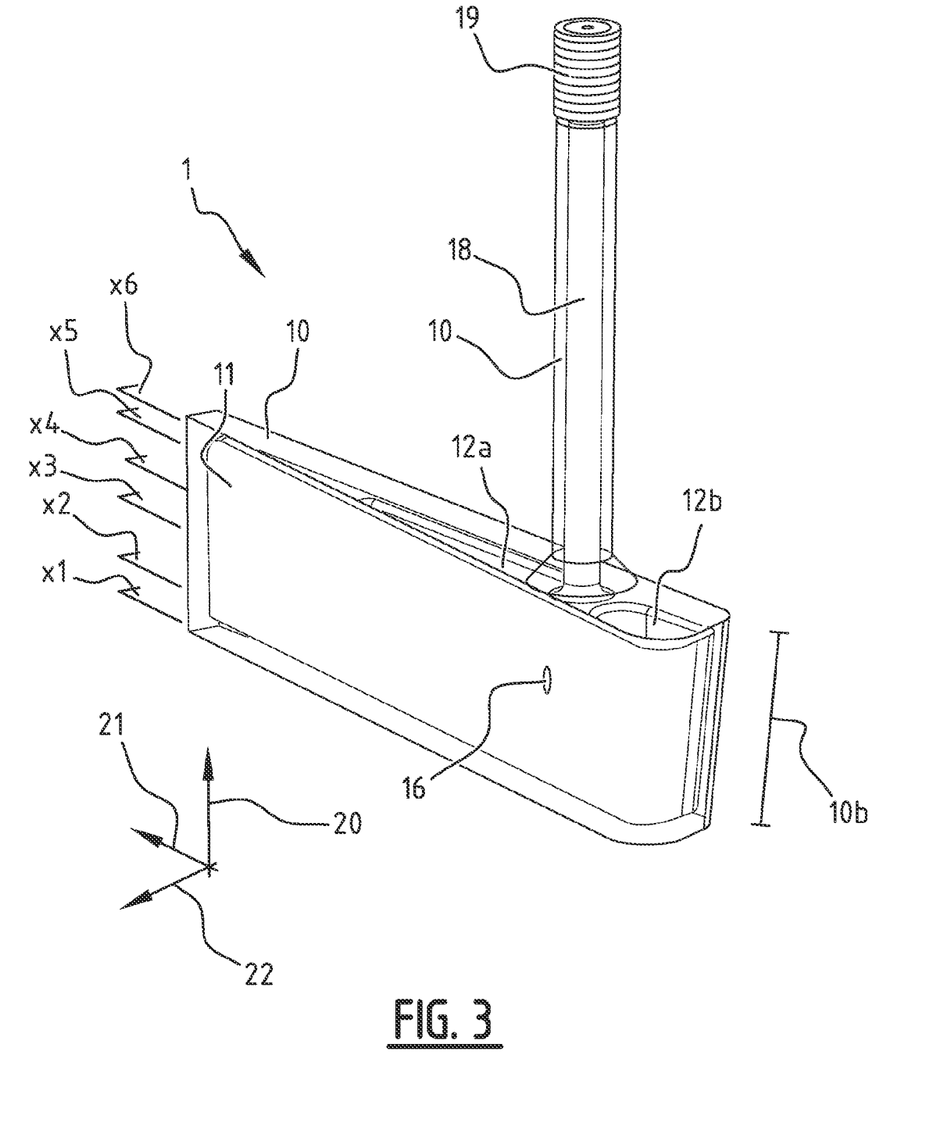
FIG. 3 schematically shows a perspective view of a tooling in accordance with one embodiment of the invention.
Figure 4:
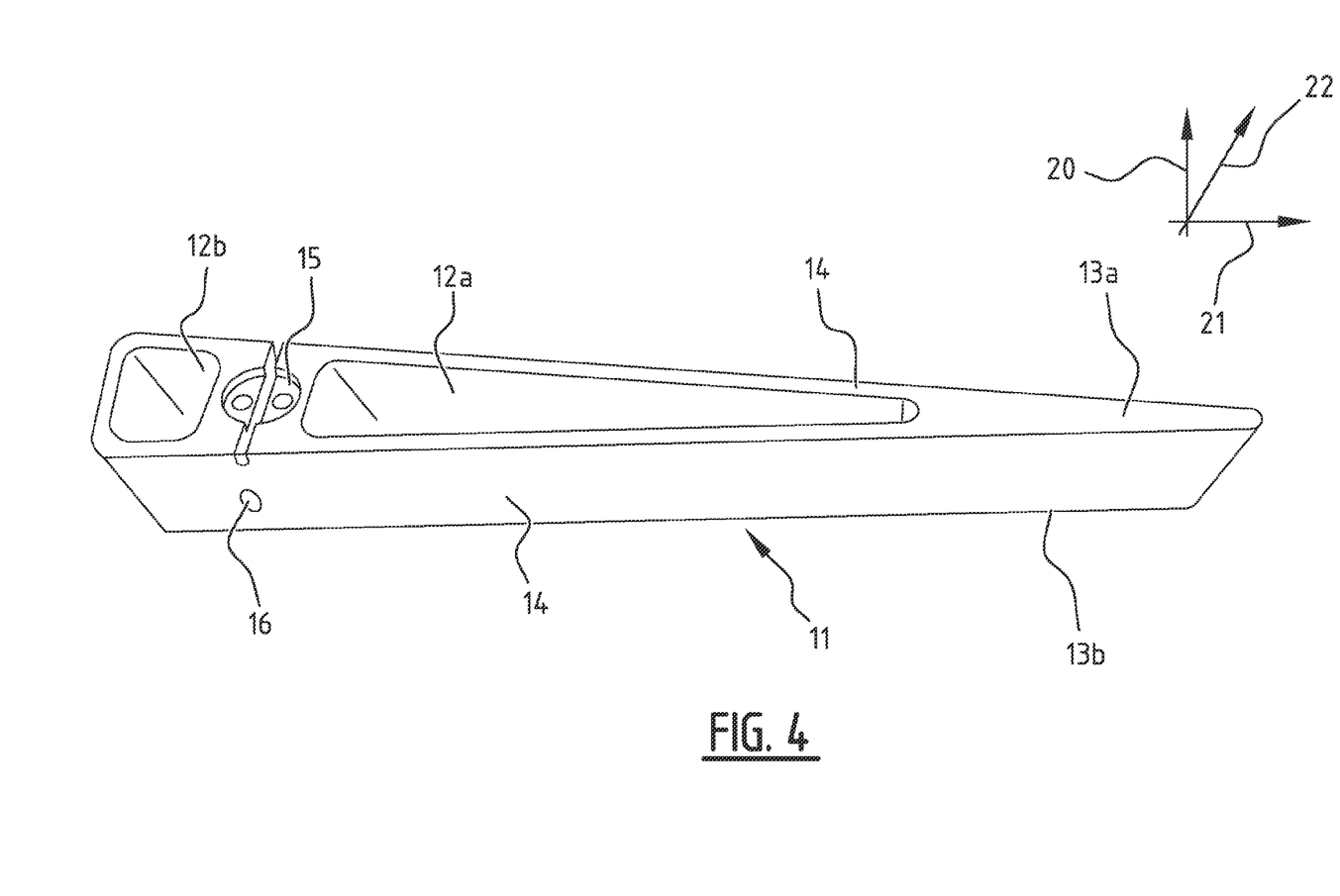
FIG. 4 schematically shows a perspective view of a stiff body that is comprised in the tooling shown in FIG. 3.

A tooling 1 according to an embodiment of the invention and to be inserted in an exemplary mold 33 is shown in FIG. 3. The tooling 1 comprises a rubber body 10 and a stiff body 11 embedded therein. As also shown in FIG. 4, the stiff body 11 is wedge-shaped and extends in an axial direction 21. The stiff body 11 is delimited in a vertical direction 20 by an upper surface 13a and a lower surface 13b, between which extend walls 14 in the vertical direction 20. The stiff body 11 further comprises cavities 12a and 12b extending between said surfaces (13a, 13b). The cavity side walls 14 are relatively thin in a transverse direction 22. A connection 15 for a pressurizing means is provided in the stiff body 11. The connection 15 provides an inlet for a pressurizing liquid, such as pressurized air for instance. An outlet 16 for the pressurized air may be provided in the two side walls 14, as shown.

The tooling 1 may be manufactured by forming the stiff body 11 first, for instance through 3D printing of a temperature-resistant polymer such as PEEK. A holder (not shown) is then provided having an inner cavity conformably shaped to the outer shape of the tooling 1. The stiff body 11 is placed inside the holder and liquid rubber is poured into the holder. This liquid rubber also fills the cavities (12a, 12b) of the stiff body 11 and, after solidification of the liquid rubber, forms the rubber body 10, in which the stiff body 11 is embedded.

As shown in FIG. 3, the stiff body 11 is shaped such that different thicknesses of the rubber body 10 are defined in different directions. For instance, the rubber body 10 has a large thickness 10b in the vertical direction 20 within the cavity 12a of the stiff body. On the other hand the rubber body 11 has a relatively small thickness 10a in a transverse direction 22, as is apparent from FIG. 5B for instance. It turns out that the different rubber body 10 thicknesses (10a, 10b, . . . ) cause a different pressure build-up in the different directions (20, 22). Indeed, the pressure build-up in the vertical direction 20 is relatively low compared to the pressure build-up in the transverse direction 22, i.e. about perpendicular to the side walls 14. The tooling 1 according to the invention thus allows generating pressure on to be welded molded parts while pressure generation in directions that do not need such pressure build-up is limited. The ability to generate anisotropic pressure is useful in lowering the stiffness and strength requirements of welding molds.

FIGS. 5A to 5F illustrate different cross-sections of the tooling at different height levels X1 to X6, wherein level X1 represents a low height level, while level X6 represents a high height level, as shown in FIG. 3.

Figure 5A:
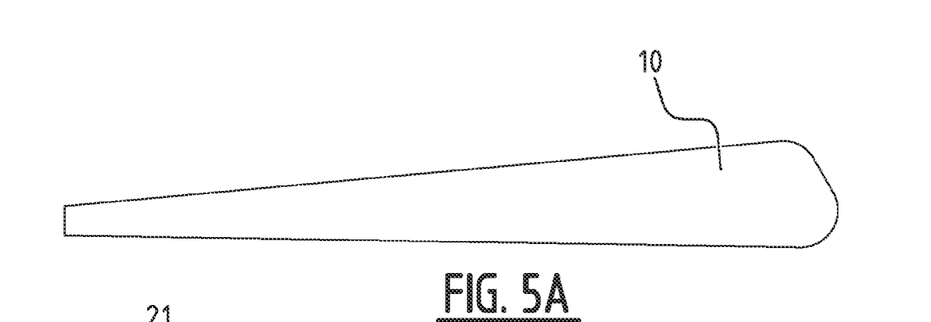
FIGS. 5A-5F schematically show cross-sectional views of the tooling of FIG. 4 in horizontal planes on different height levels.

FIG. 5A shows a cross-section taken at level X1 through the rubber body 10.

Figure 5B:
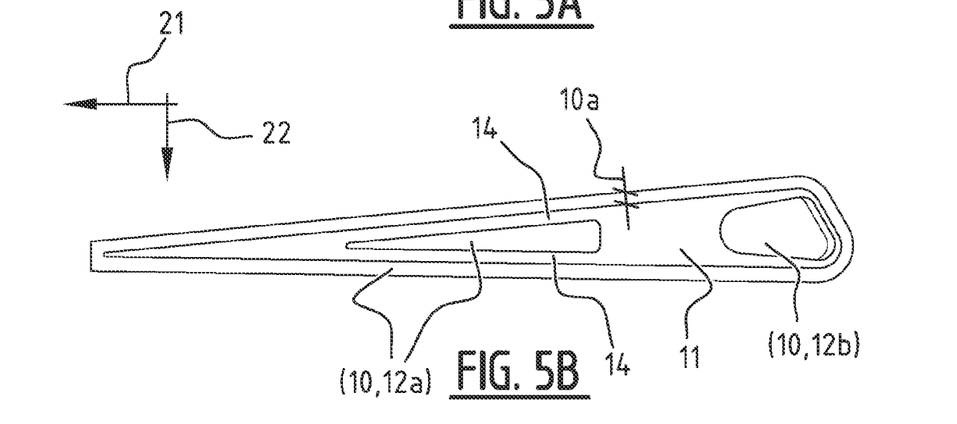

FIG. 5B shows a cross-section taken at level X2 through a lower part of the stiff body 10 that is filled with the rubber body 10 in cavities 10a and 10b.

Figure 5C:
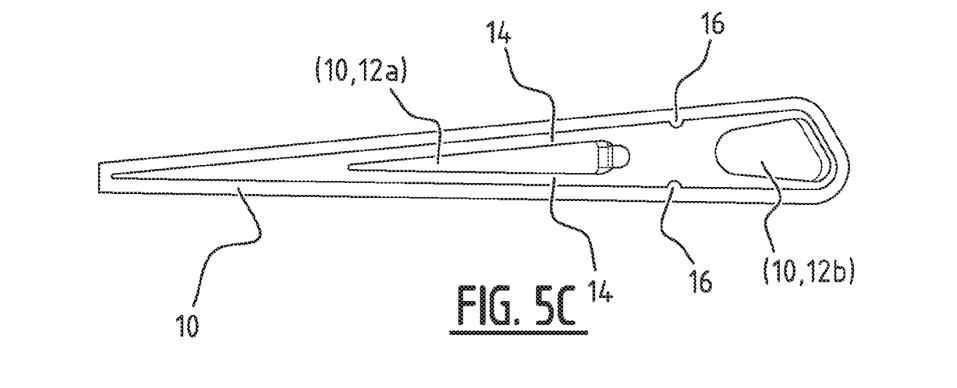

FIG. 5C shows a cross-section taken at level X3 through a middle part of the stiff body 10 at the height of the outlets 16 for the pressurized air.

Figure 5D:
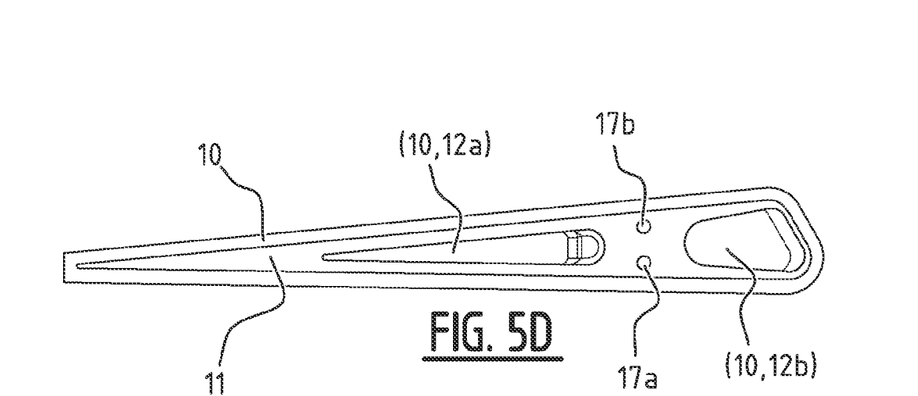
Figure 7:
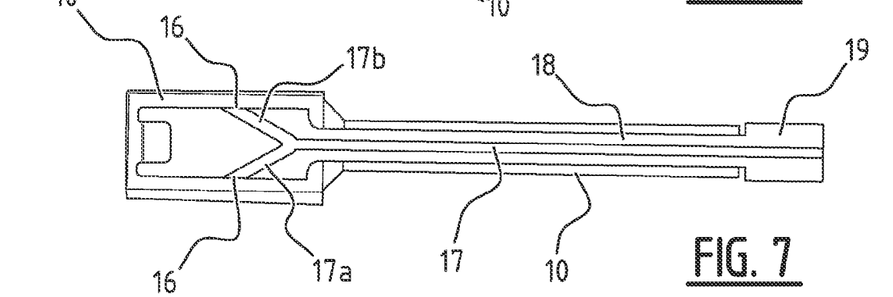
FIG. 7 schematically shows a cross-sectional side view of the tooling in a vertical plane through pressurizing means connected to the tooling.

FIG. 5D shows a cross-section taken at level X4 through a higher part of the stiff body 10 at the height of a bifurcated inlet duct 17 (17a, 17b) for pressurized air, as also shown in FIG. 7. The duct 17 for pressurized air is provided in a rod 18 which is connected to the stiff body 11 through connection 15 and also coated with rubber to be part of the rubber body 10. The duct 17 is fluidly connected to a source of pressurized air (not shown) through a connector 19.

Figure 5E:
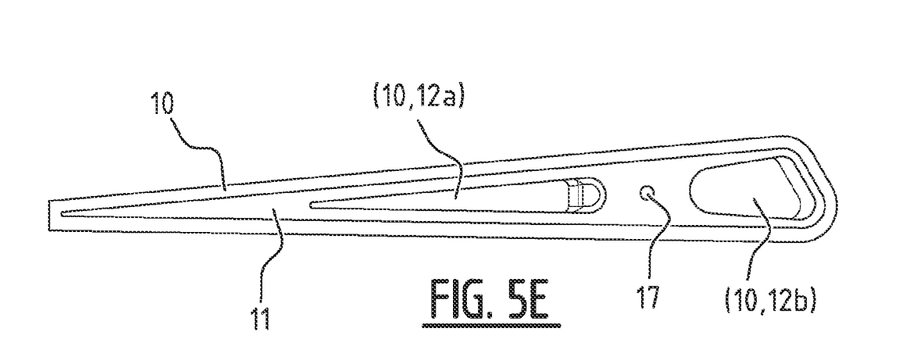

FIG. 5E shows a cross-section taken at level X5 through a yet higher part of the stiff body 10 at the height above the bifurcation of the inlet duct 17 for pressurized air.

Figure 5F:
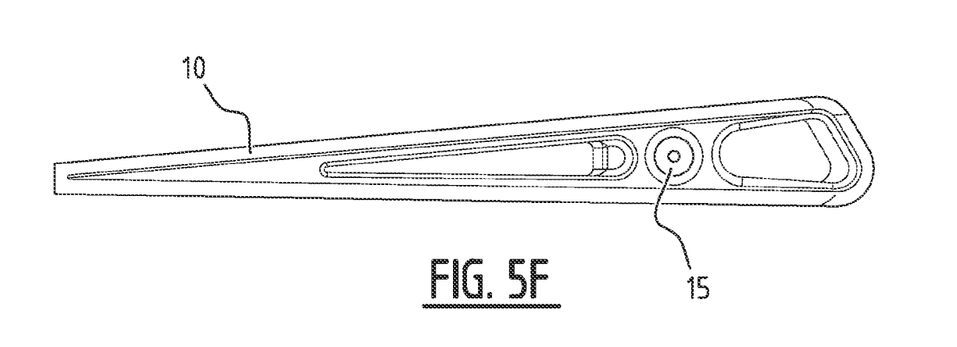

FIG. 5F finally shows a cross-section taken at level X6 through the rubber body 10 at the top of the tooling 1, a yet higher part of the stiff body 10 at the height above the bifurcation of the inlet duct 17 for pressurized air.

Figure 6:
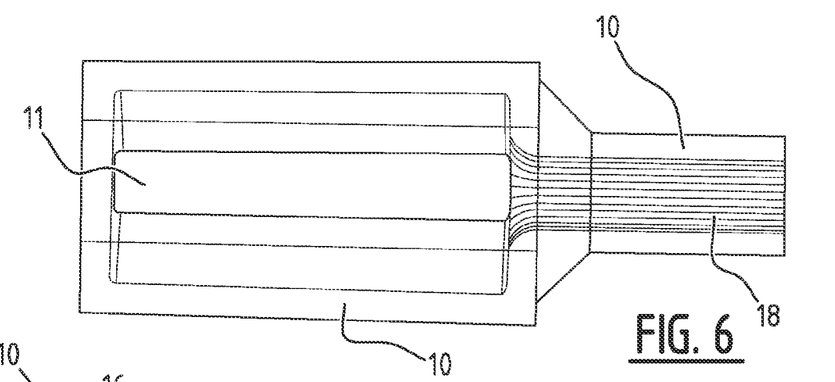
FIG. 6 schematically shows a cross-sectional side view of the tooling in a vertical plane.
Figure 8:
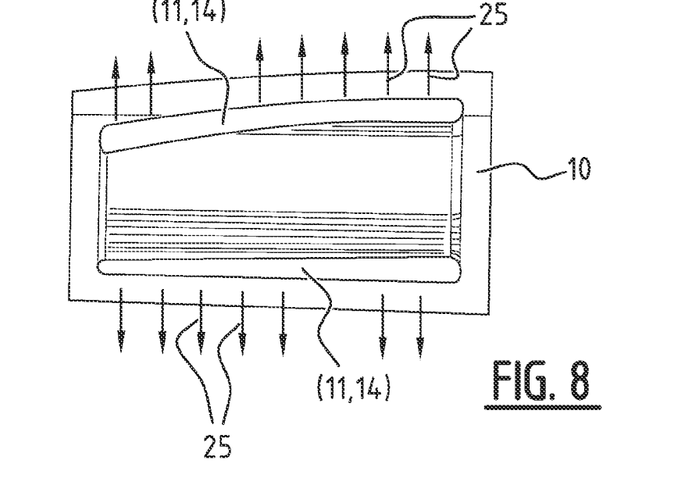
FIG. 8 schematically shows a cross-sectional side view of the tooling in a vertical plane through pressurizing means connected to the tooling; and finally FIG. 9 schematically illustrates a tooling assembly that incorporates a tooling according to an embodiment of the invention.

With reference to FIG. 6, a cross-sectional side view of the tooling 1 in a vertical plane is schematically shown. A cross-sectional side view of the tooling 1 in a vertical plane through the rod 18 containing the duct 17 for pressurized air is schematically shown in FIG. 7, while FIG. 8 schematically shows a cross-sectional side view of the tooling 1 in a vertical plane. As shown in FIG. 8, the tooling 1 is configured such that pressure is essentially build-up where it is needed, i.e. about perpendicular to the side walls 14 of the stiff body 11 as illustrated by the arrows 25.

Figure 9:
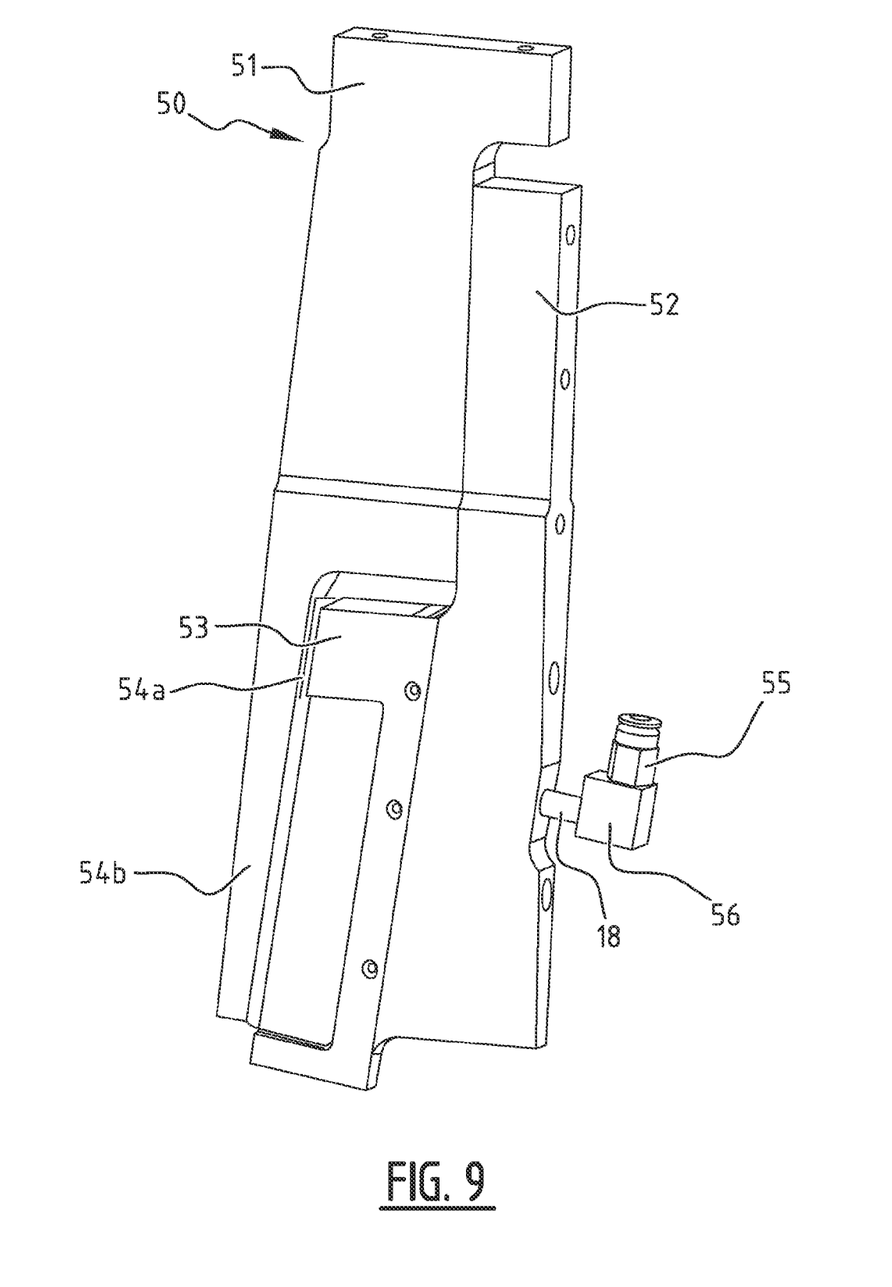

Referring now to FIG. 9, a tooling assembly 50 that incorporates a tooling 1 according to an embodiment of the invention is schematically illustrated. The tooling assembly 50 comprises two frame parts 51 and 52 that are bolted together and that hold a heat shield 53 as well as the molded parts 54 a and 54b to be joined by electromagnetic welding. A tooling 1 has been inserted within the tooling assembly 50 to pressurize the contacted surfaces of the molded parts (54a, 54b) to be welded. The tooling 1 is only partly visible in FIG. 9 through the rod or hose 18. A high pressure Festo connector 55 is applied to the hose 18, optionally through the use of an adapted 56. A source of pressurized air for pressuring the tooling 1 and the contacted surfaces (42, 42') enters the hose 18 through being connected to the Festo connector 55.

When pressuring the tooling 1, pressure will essentially develop perpendicular to the side walls 14 of the stiff body 11, as shown in FIG. 8. The frame parts 51 and 52 only need to resist the pressure developed in said direction, and there is lees or no need to stiffen the tooling assembly 50 in other directions. The tooling 1 also is advantageous in being able to pressurize relatively small surfaces, and/or to accommodate relatively small radii of curvature.

The invention is not limited to the above given examples and variations thereto may be envisaged within the scope of the appended claims.

The invention claimed is:

1. A tooling for use in a method for electromagnetic welding of two contacted surfaces of molded parts, the tooling comprising:
   a rubber body, and pressurizing means for pressurizing the rubber body and applying pressure to the contacted surfaces,
   wherein the rubber body comprises an embedded stiff body shaped to define different rubber body thicknesses in different directions which causes a different pressure build-up in said different directions, and
   wherein the pressurizing means comprises channeling provided in the stiff body, which channeling is connected at one end to a pressure source and at another end to the rubber body.

2. The tooling according to claim 1, wherein that part of the rubber body that is configured to pressurize the contacted surfaces has a smaller thickness than other parts of the rubber body.

3. The tooling according to claim 2, wherein the part of the rubber body that is configured to pressurize the contacted surfaces has a smaller thickness than any other part of the rubber body.

4. The tooling according to claim 1, wherein the pressure build-up is larger at smaller thickness.

5. The tooling according to claim 1, wherein the rubber body adheres to the embedded stiff body.

6. The tooling according to claim 1, wherein the stiff body has an upper and lower surface and walls extending in between said surfaces, and a cavity extending between said surfaces and filled with a part of the rubber body.

7. The tooling according to claim 1, wherein the pressure source comprises a source of pressurized air.

8. The tooling according to claim 1, wherein the stiff body is made from a polymeric material.

9. The tooling according to claim 1, wherein the stiff body further comprises at least one of a pressure sensor or a temperature sensor.

10. A method for manufacturing the tooling of claim 1, the method comprising:
    forming the stiff body,
    providing a holder having the shape of the tooling,
    placing the stiff body inside the holder,
    pouring liquid rubber into the holder, and
    letting the rubber solidify to provide the rubber body.

11. The method according to claim 10, wherein the stiff body is formed by machining.

12. The method according to claim 10, wherein the stiff body is formed by 3D printing.

13. The method according to claim 10, wherein at least one of a pressure sensor or a temperature sensor is provided in the stiff body.

14. A method for electromagnetic welding of two contacted surfaces of molded parts, the method comprising:
- providing a tooling in accordance with claim 1,
- pressurizing the rubber body of the tooling and applying pressure to the contacted surfaces,
- moving a joining inductor along the pressurized contacted surfaces of the molded parts,
- generating an electromagnetic field in an induction-sensitive component of the molded parts to heat a thermally activated coupling means of the molded parts to above a melting temperature of the coupling means, and
- joining the molded parts to each other in the contact surfaces by the molten coupling means.

15. The method according to claim 14, wherein the thermally activated coupling means comprises a thermoplastic plastic.

* * * * *